United States Patent [19]
Johnson

[11] Patent Number: 6,001,011
[45] Date of Patent: Dec. 14, 1999

[54] FISH HARVESTER

[75] Inventor: James George Johnson, Shetland, United Kingdom

[73] Assignee: Nordischer Maschinenbau Rud. Baader GmbH & Co KG, Lubeck, Germany

[21] Appl. No.: 08/981,605

[22] PCT Filed: Jul. 1, 1996

[86] PCT No.: PCT/GN96/01583

§ 371 Date: May 6, 1998

§ 102(e) Date: May 6, 1998

[87] PCT Pub. No.: WO97/01285

PCT Pub. Date: Jan. 16, 1997

[30] Foreign Application Priority Data

Jun. 29, 1995 [GB] United Kingdom ................... 9513271

[51] Int. Cl.⁶ .................................................. A22C 25/06
[52] U.S. Cl. .................................. 452/65; 452/54; 452/67
[58] Field of Search ................................... 452/52, 54, 65, 452/66, 67, 68, 196, 166, 161

[56] References Cited

U.S. PATENT DOCUMENTS

| | | | |
|---|---|---|---|
| 3,362,406 | 1/1968 | Logsdon | 452/66 |
| 3,548,447 | 12/1970 | Price, Jr. | 452/66 |
| 3,675,273 | 7/1972 | Vidjak . | |
| 4,127,919 | 12/1978 | Buddecke . | |
| 4,300,263 | 11/1981 | Gotz | 452/67 |
| 4,899,422 | 2/1990 | King . | |
| 5,376,043 | 12/1994 | Carter . | |
| 5,492,502 | 2/1996 | Hjorth | 452/166 |
| 5,591,076 | 1/1997 | Evers et al. | 452/161 |

FOREIGN PATENT DOCUMENTS

| | | |
|---|---|---|
| 2.205.275 | 5/1974 | France . |
| 628 177 | 3/1936 | Germany . |
| 1654992 | 3/1971 | Germany . |
| 2 225 795 | 12/1972 | Germany . |
| 9103738 | 7/1991 | Germany . |
| 4216842A1 | 11/1993 | Germany . |
| 9309936 | 5/1994 | Germany . |
| 2 065 447A | 7/1981 | United Kingdom . |

*Primary Examiner*—Willis Little
*Attorney, Agent, or Firm*—Beall Law Offices

[57] ABSTRACT

A fish harvester for the automatic and humane slaughter of fish comprises a fish accommodating space having an entrance for insertion of a fish and an exit for removal of a fish. The harvester includes means for positioning and retaining a fish, a slaughtering member for slaughtering a fish by contact with some portion of a fish; and driving means for driving said slaughtering member. The slaughter member preferably includes spikes for insertion into the brain of the fish. The harvester preferably automatically severs a major blood vessel in order to allow bleeding of said fish. The harvester preferably automatically gauges the size of the fish and positions the fish and the slaughtering member relative to each other, with reference to the size of the fish, in order to allow effective operation. A method of automatically slaughtering fish is also provided.

21 Claims, 12 Drawing Sheets

FISH HARVESTER

The present invention relates to a fish harvester and especially but not exclusively to a fish harvester for reducing the stress to fish immediately preceding slaughter.

At present fish such as farmed salmon and trout are slaughtered manually by insertion of the thumb behind an outer gill cover and inwards towards the main artery which runs between the gills and the body of the fish. Severing this artery results in death of the fish. Slaughter of fish in this way is relatively slow and is thus stressful to the fish. In addition it is relatively time consuming since each fish must be handled and slaughtered manually. A method of slaughtering fish in a more humane, less stressful and quicker fashion is therefore desirable.

Since fish such as salmon and trout are often marketed on appearance it is commercially important that slaughtering such fish should not involve an unduly large amount of external damage to the fish and should leave the final presentation of the fish of a high standard.

It is known that an effective method of slaughtering animals is to insert a spike into the brain. In particular, U.S. Pat. No. 5,376,043 describes apparatus for killing and holding catfish including a spike adapted to be driven into the head of the fish by being hit with a mallet. The catfish is retained by insertion into a V-shaped groove in a plate substantially perpendicular to the axis of the fish such that the pectoral fins of the catfish engage the inclined edges of the groove and prevent the fish from moving relative to the groove. The apparatus is designed to securely hold each catfish for a considerable length of time enabling, for example, skinning of the fish. Each fish must be manually inserted into the groove. The physiology of many fish does not provide pectoral fins which would enable the fish to be retained by the disclosed apparatus. U.S. Pat. No. 4,127,919 also provides apparatus for killing a catfish by driving a spike into the head of the catfish. The spike is attached to a lever which may pivot relative to a base upon which the fish is laid and the spike is driven into the head of the fish by manually applying a force to the lever. A box-like structure is provided to accommodate the head of the fish.

According to a first aspect of the present invention there is provided a fish harvester comprising a fish accommodating space having entrance means to allow insertion of a fish and exit means to allow removal of a fish; positioning and retaining means for positioning a fish; a slaughtering member for contact with some portion of a fish; and driving means for driving said slaughtering member.

Preferably, said slaughtering member comprises a blade adapted to sever one or more blood vessels of said fish.

Preferably, said slaughter member includes spike means adapted to impact said fish.

Preferably, said spike means slaughters said fish by damaging the brain of said fish.

Preferably, said slaughter member is adapted to inject a fluid into said fish.

Alternatively, said slaughter member may be adapted to apply a vacuum to some part of said fish.

The spike means may comprise a solid spike.

The spike means may include a rigid main spike portion and a movable subsidiary spike portion adapted to be movable relative to said solid spike portion after insertion into said fish.

Preferably, there is provided a severing member adapted to sever one or more blood vessels of said fish in order to allow bleeding of said fish.

Preferably, said severing member is adapted to pass between a gill cover and the body or head of said fish.

Alternatively, said severing member may be adapted to pass into the mouth of said fish.

The severing member may be adapted to pass into the throat of said fish.

Preferably, said severing member is adapted to sever a major artery of said fish.

The positioning and retaining means may comprise one or more shaped sections of a wall defining said fish accommodating space.

Preferably, said positioning and retaining means comprises at least one movable fish engaging member adapted to engage said fish.

Preferably, said positioning and retaining means comprises at least one fish engaging member adapted to engage one or more front and/or side portions of the head of said fish.

Preferably, said positioning and retaining means comprises a fish engaging member adapted to engage an upper portion of said fish.

Preferably, said positioning and retaining means comprises a fish engaging member adapted to engage a side of said fish.

Preferably, there are provided first and second movable fish engaging members adapted to engage respective first and second sides of said fish.

Preferably, at least one fish engaging member is movable relative to said fish accommodating space and, in use, biased towards some portion of said fish but movable against said bias by engagement with said fish.

Preferably, there is provided sensor means for detecting the presence of a fish within said fish accommodating space.

Preferably, said sensor is operated by engagement of a fish with some part of said positioning and retaining means.

Preferably, there is provided gauging means for gauging the size of said fish.

Preferably, said gauging means includes means to gauge the size of the fish by reference to characteristics of the fish positioning and retaining means.

Preferably, said gauging means comprises one or more movable members for engaging said fish.

Preferably, there is provided adjustable positioning means for selectively positioning a fish relative to the slaughter member. Preferably, the adjustable positioning means comprises a part of the positioning and retaining means.

Alternatively or additionally, there may be provided adjustable positioning means for positioning the slaughter member relative to the fish accommodating space.

There may also be provided adjustable positioning means for adjustably positioning the severing member relative to the fish.

Preferably, the adjustable positioning means operates automatically with reference to the gauged size of the fish.

Preferably, the gauging means comprises one or more movable members for engaging said fish and the adjustable positioning means is mechanically coupled to said gauging means.

Preferably, said entrance means and said exit means are separate.

Preferably, said exit means comprises one or more members provided at the bottom of said fish accommodating space which may be displaced in order to allow a fish to fall from said fish accommodating space.

The entrance means may comprise, for example, a motor, or a fluid operated system.

According to a second aspect of the present invention there is provided a method of slaughtering fish comprising the steps of: gauging the size of a fish; relatively positioning a slaughtering member and said fish with reference to said gauged size of said fish; and operating said slaughtering member in order to slaughter said fish.

Preferably, said step of gauging the size of said fish comprises automatic gauging of said size.

Embodiments of the present invention will now be described with reference to the accompanying drawings in which:

FIG. 1a is a schematic part-sectional view of an embodiment of fish harvesting apparatus in accordance with the present invention;

FIG. 1b is an end elevation of the apparatus of FIG. 1a;

FIG. 2a is a side view of a knife for use in the embodiment of FIG. 1a;

FIG. 2b is a side view of a spike-bearing member for use in the embodiment of FIG. 1a;

FIG. 3 is a schematic plan view of the apparatus of FIG. 1a;

FIG. 4b is a plan view of the apparatus of FIG. 4a;

FIG. 5a is a plan view of part of a fish size measuring mechanism used in the embodiment of FIG. 4a;

FIG. 5b is a side elevation of the mechanism shown in FIG. 5a;

FIG. 6a is a side view of a fish head location plate mechanism for use in the embodiment of FIG. 4a;

FIG. 6b is a plan view of the fish head location plate FIG. 6a;

FIGS. 7a and 7b are respectively side and end views of a pressure wheel mechanism used in the embodiment of FIG. 4a;

FIGS. 8a and 8b are respectively end and side views of a spike-bearing mechanism used in the embodiment of FIG. 4a;

FIGS. 9a and 9b are respectively plan and side views of a knife-bearing mechanism used in the embodiment of FIG. 4a;

Figures 1A, 1B, 2A, 2B:
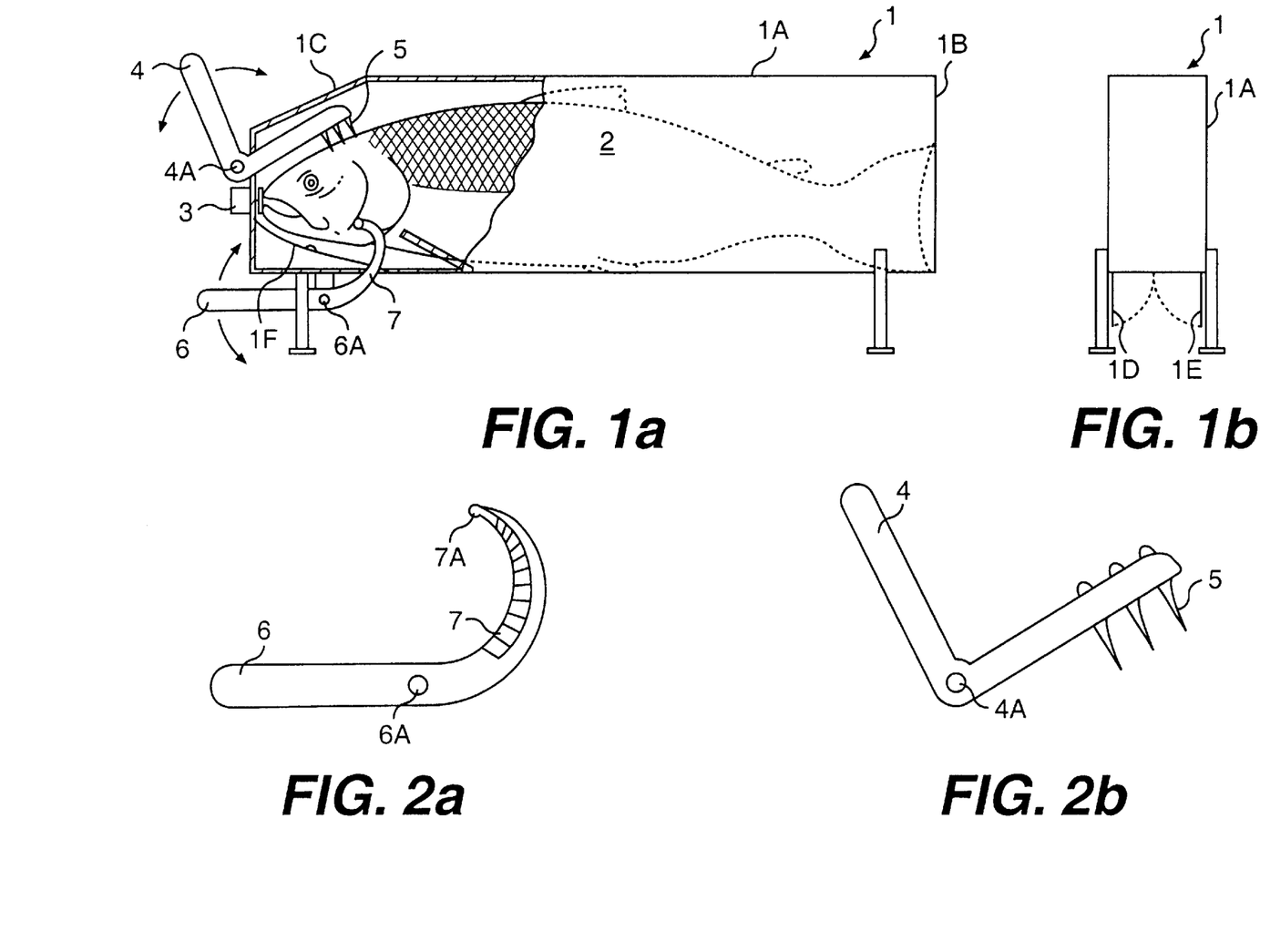
Figure 3:
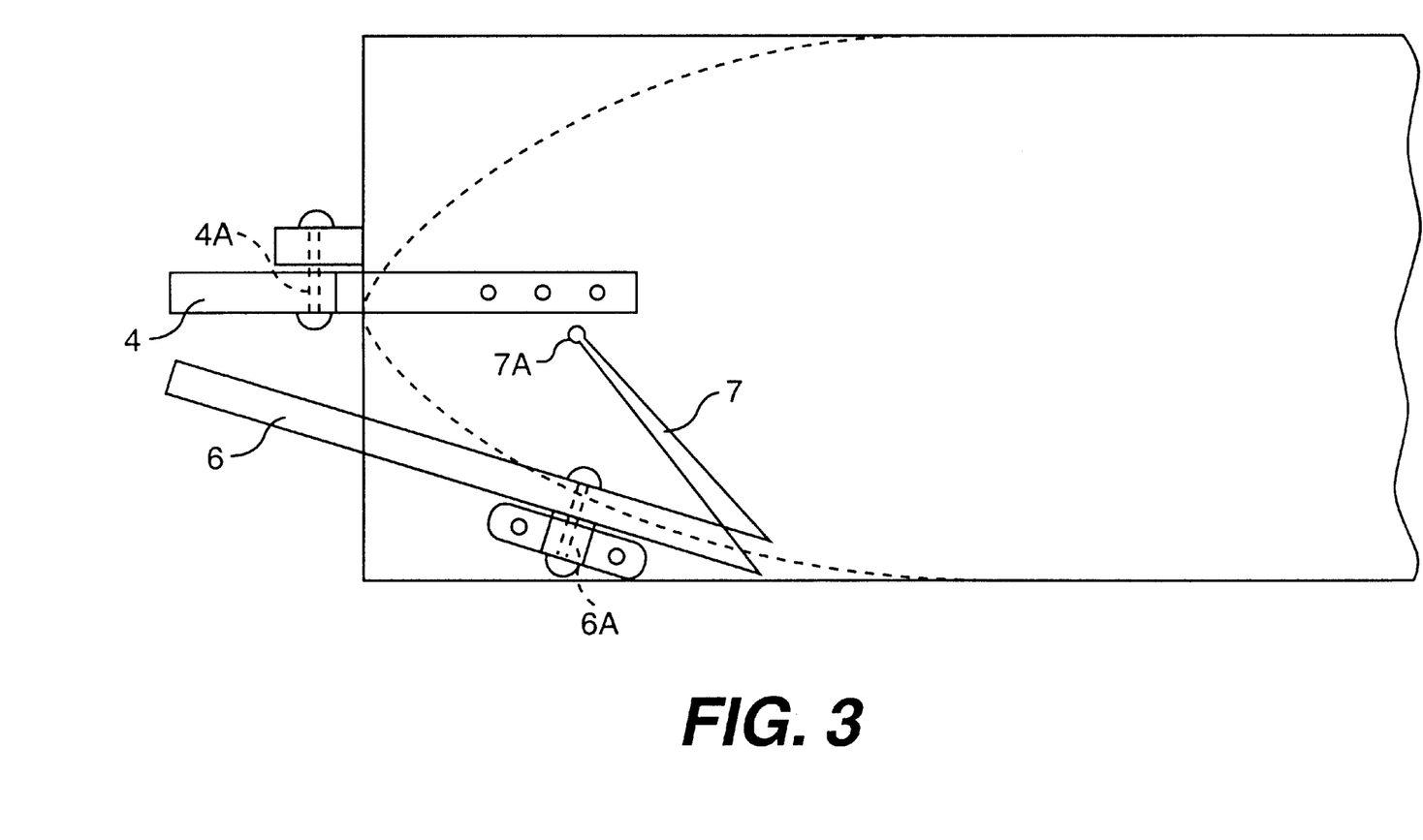

With reference to FIGS. 1 to 3 a first embodiment of a fish harvesting apparatus, generally designated 1, in accordance with the present invention, comprises a housing 1A defining a fish accommodating space 2. The housing 1A has a first open end 1B through which a fish may be inserted into the fish accommodating space 2. The housing has a second end 1C which in use accommodates the head of the fish. Located at the second end 1C of the housing there is provided a spike-bearing member 4 provided with spikes 5 adapted for insertion into the head of a fish. Also provided at the second end 1C of the housing is provided a sensor 3 enabling detection of the head of a fish at the end 1C of the housing. Also provided at the second end 1C of the housing is a knife-bearing member 6 which bears a knife 7 adapted for insertion between the gill cover and the head or body of a fish. The housing 1A is provided with two trap doors 1D, 1E which are operable to allow egress of a fish from the fish accommodating space 2 to, for example, a holding tank (not shown).

In use, the doors 1D, 1E are initially closed and a fish is inserted head first via the first end 1B into the fish accommodating space 2. When the head of the fish contacts the sensor 3 at the second end 1C of the housing, the spike-bearing member 4 is operated by driving means (not shown) to pivot around a pivot point 4A in order to drive the spikes 5 into the head of the fish thus instantaneously killing the fish. Very shortly after operation of the spike-bearing member 4, the knife-bearing member 6 is operated by driving means (not shown) to pivot around a pivot point 6A so as to insert the knife 7 between the gill cover and the head or body of the fish thus severing the main artery and allowing the fish to be successfully bled. The fish is thus killed in an instantaneous and stress-free manner and is also successfully bled. The doors 1D, 1E are then operated allowing the fish to drop from the fish accommodating space 2 into the holding tank (not shown).

The first embodiment of the fish harvesting apparatus in accordance with the present invention thus provides a method of rapidly slaughtering and bleeding a fish with minimum stress to the fish which requires only insertion of the fish into a fish accommodating space 2 which may be conveniently positioned with respect to an operator. Furthermore the insertion of the fish into the fish accommodating space may be automated, thus effectively automating the entire fish slaughtering and bleeding process.

The driving means which operate the spike-bearing member 4, knife-bearing member 6 and the doors 1D, 1E are preferably parts of a pneumatic system but, of course, other means of driving the apparatus could be used.

The knife 7 comprises a curved blade with a rounded tip 7A. As illustrated in FIG. 3 the blade is not planar but is generally part-helical in form. This enables insertion of the blade between the gill cover and the head or body of the fish. In order to securely position and retain fish relative to the spike-bearing member 4, sensor 3 and knife-bearing member 6, positioning and retaining means may be provided. In the embodiment of FIGS. 1 to 3 this comprises the shape of the fish accommodating space 2 as formed by the housing 1A, including a shaped wall portion 1F adjacent the second end 1C of the housing 1.

In order to securely accommodate and retain fish of various sizes, it is desirable that the width of the fish accommodating space be variable.

In order to provide an automated fish harvesting apparatus capable of humanely slaughtering and bleeding fish of greatly differing sizes, means may be provided for automatically positioning the spikes and knife relative to the fish, the positions of these elements being determined with reference to the size of the fish. This can be achieved by providing means to gauge the size of the fish connected to means to effect correct positioning of the spike-bearing member and the knife-bearing member relative to the fish. A second, preferred, embodiment including these features is illustrated in FIGS. 4a to 10.

Figure 4A:
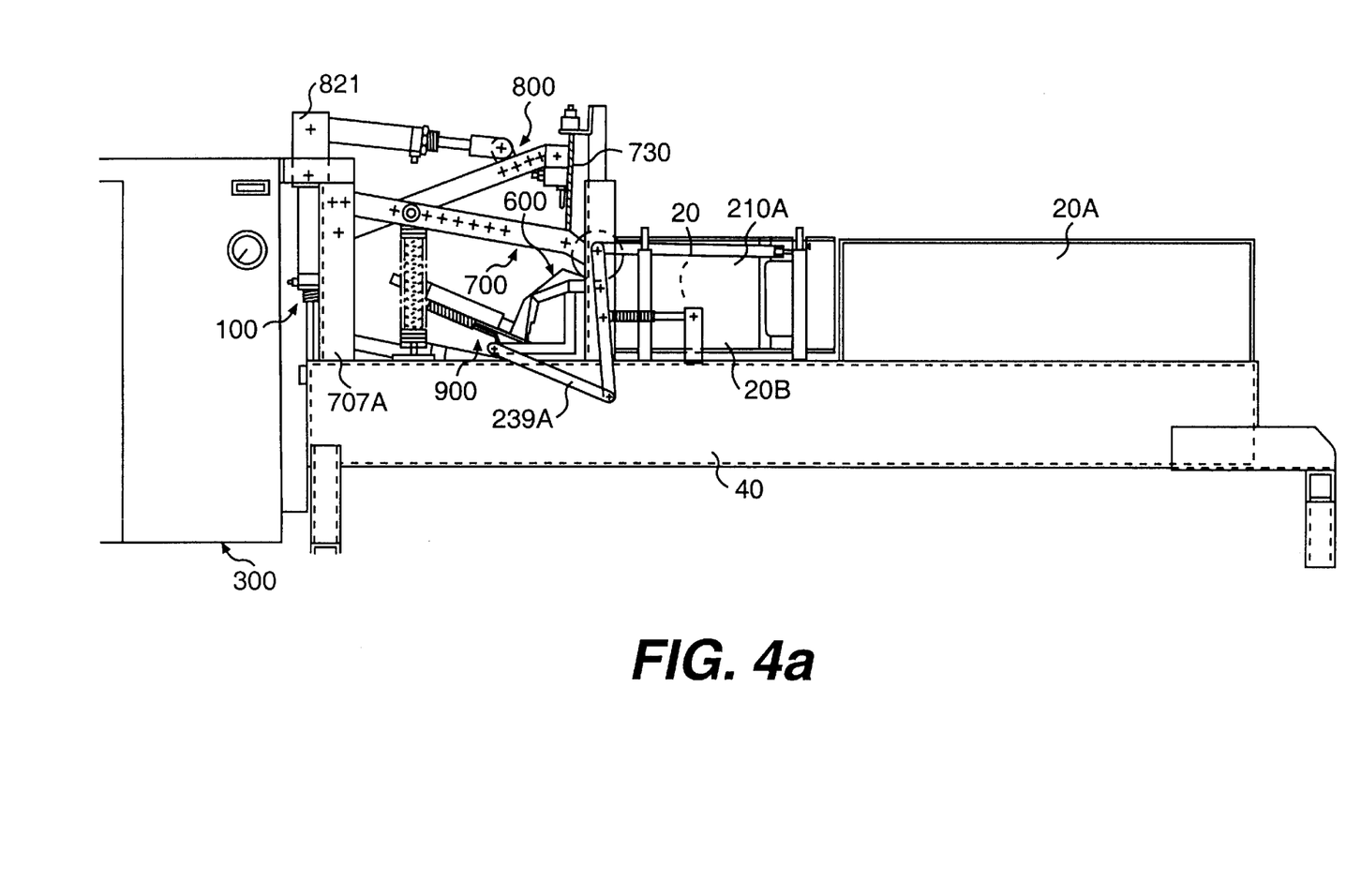
FIG. 4a is a side view of a further embodiment of apparatus according to the present invention.
Figure 4B:
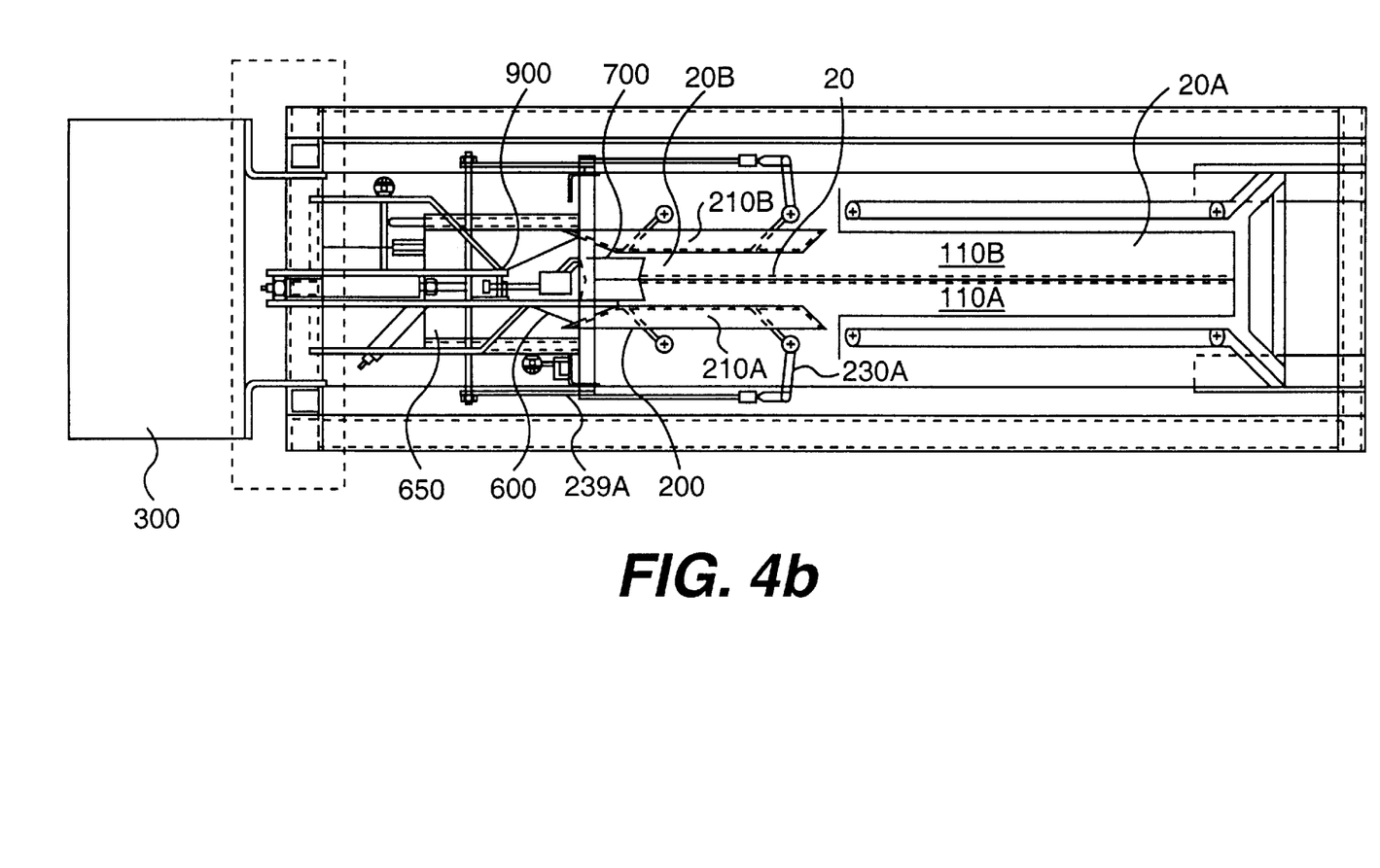

FIG. 4a is a side view of the second, preferred, embodiment of a fish harvesting apparatus in accordance with the present invention and FIG. 4b is a plan view of the embodiment of FIG. 4a. FIGS. 5a to 10 illustrate elements of the apparatus of FIGS. 4a and 4b.

The second embodiment of the fish harvesting apparatus in accordance with the present invention comprises a bench mounted base frame 40 above which there is provided an elongate fish accommodating space 20. The fish accommodating space has a first elongate end portion 20A into which a fish may be placed from above (with its head towards the left in the apparatus as shown in FIGS. 4a and 4b) and from which it is moved to a second elongate end portion 20B. The second elongate end portion 20B is bounded on its long sides by a pair of laterally movable plates 210A, 210B which form part of a fish size measuring mechanism 200 (see in particular FIGS. 5*a* and 5*b*) and also constitute part of a fish positioning and retaining means. In general throughout the description of this embodiment, the term longitudinal will refer to directions substantially parallel to the axis of the elongate fish accommodating space, and the horizontal perpendicular direction will be referred to as lateral or transverse.

The apparatus includes a head location plate mechanism 600 (see in particular FIGS. 6*a* and 6*b*) which includes a sensor, and which constitutes an element of the fish positioning and retaining means. The head location plate mechanism 600 can move relative to the fish accommodating space 20 by virtue of being mounted on a mounting plate 650 (see in particular FIG. 6*c*) which can slide longitudinally relative to the fish accommodating space 20.

The apparatus also includes a pressure wheel mechanism 700 (see in particular FIGS. 7*a* and 7*b*) which constitutes a further element of the fish positioning and retaining means. The apparatus further includes a spike mechanism 800 (see in particular FIGS. 8*a* and 8*b*), a knife (or blade) bearing mechanism 900 (see in particular FIGS. 9*a*, 9*b* and 9*c*), a door operating mechanism 100 (see in particular FIG. 10) and a pneumatics control box 300.

Figure 5A:
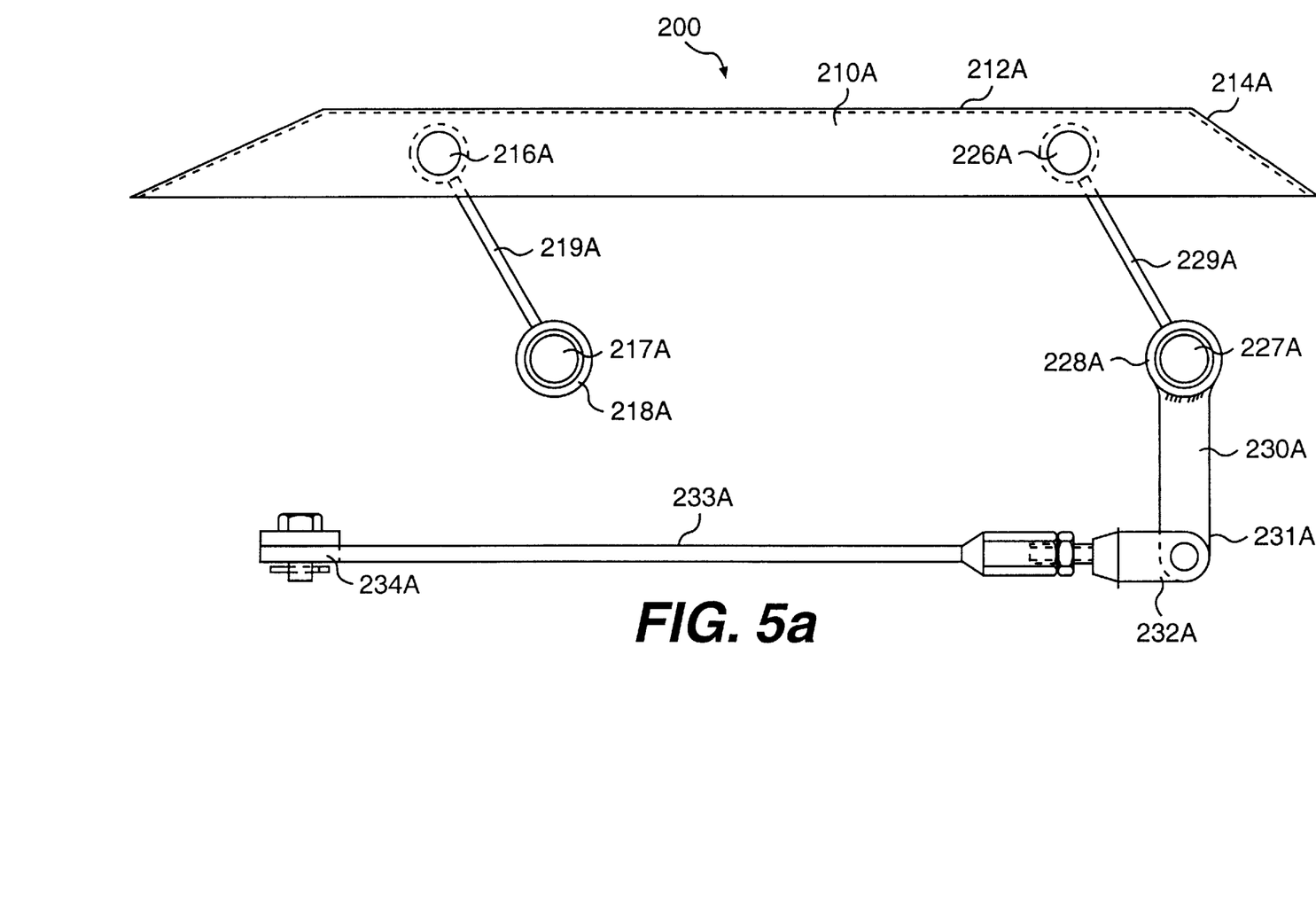
Figure 5B:
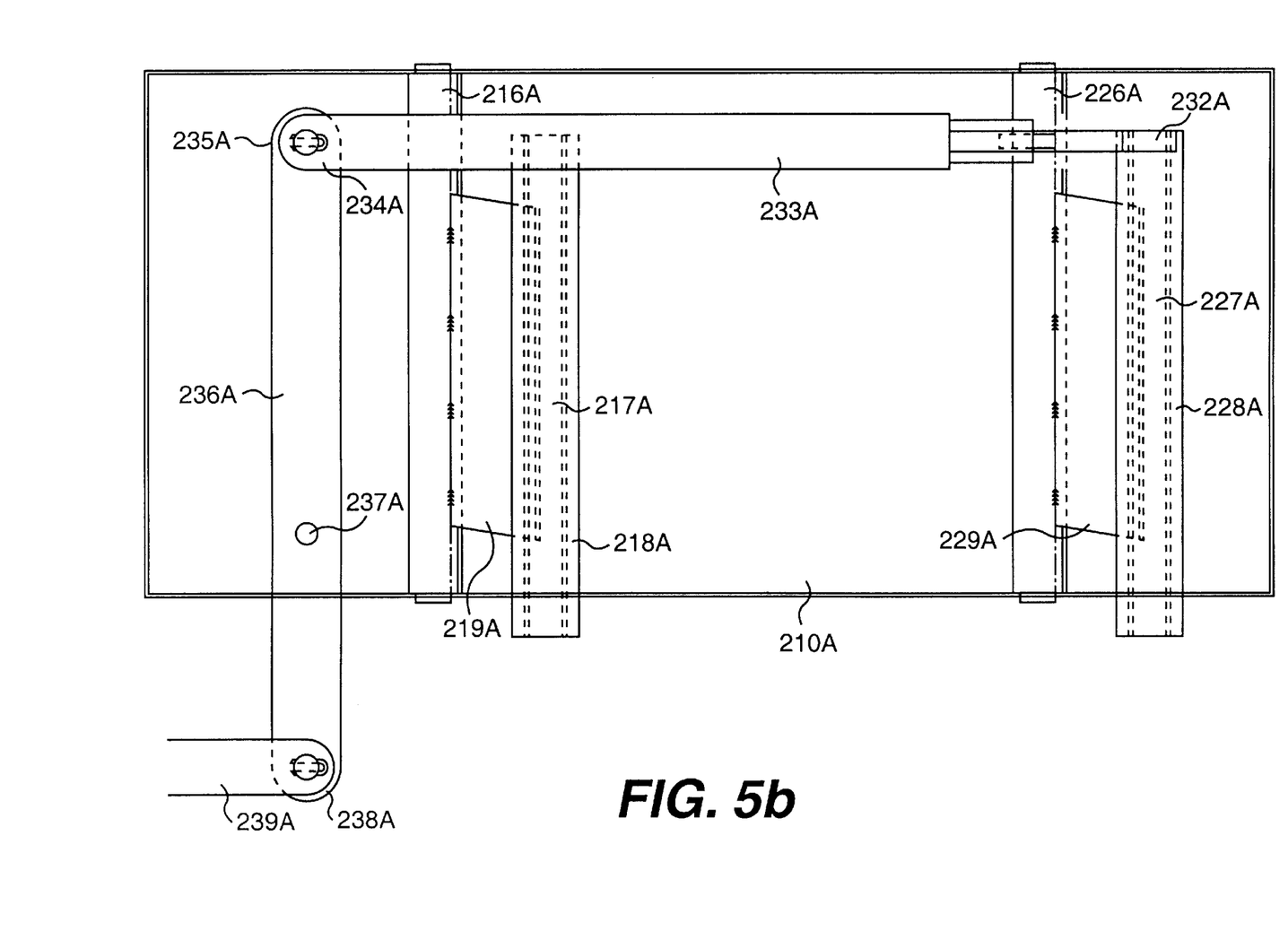

FIGS. 5*a* and 5*b* show one of the pair of elongate laterally movable plates 210A, 210B which form part of the fish size measuring mechanism 200. Only one plate 210A is shown in FIGS. 5*a* and 5*b*, and described in detail because the other plate 210B and associated mechanism is a corresponding mirror image.

The laterally movable plate 210A has a longitudinal fish-engaging surface 212A and a bevelled fish engaging surface 214A. The laterally movable plate 210A is supported by first and second vertical rods 216A, 226A which may pivot relative to said plate 210A. First and second support columns 217A, 227A are provided and each is attached rigidly to the base 40. The first and second support columns 217A, 227A are provided with respective first and second cylindrical outer sleeves 218A, 228A able to rotate relative to the respective support columns 217A, 227A. A first link member 219A is rigidly attached to the first vertical rod 216A and to the first cylindrical outer sleeve 218A. A second link member 229A is rigidly attached to the second vertical rod 226A and to the second cylindrical outer sleeve 228A. The laterally movable plate 210A may thus move laterally whilst supported by the base 40 via the first and second support columns 217A, 227A, although the motion of the plate 210A will also include a longitudinal component because the rods 216A, 226A will, in use, describe arcs about the support columns 217A, 227A. Said motion of the plate will cause rotation of the first and second cylindrical outer sleeves 218A, 228A.

The second cylindrical outer sleeve 228A is rigidly attached to the first end of a displacement member 230A, which extends radially away from the second column 227A. The second end 231A of the displacement member 230A is therefore displaced by movement of the plate 210A. The second end 231A of the displacement member 230A is pivotably coupled to a first end 232A of a first longitudinal transmission member 233A, which extends substantially parallel to the axis of the fish accommodating space 20. The second end 234A of the first longitudinal transmission member 233A is pivotably coupled to a first end 235A of a pivoting transmission member 236A, which pivots about a pivot point 237A in a middle portion thereof. The second end 238A of the pivoting transmission member 236A is pivotably coupled to a first end of a second longitudinal transmission member 239A.

The effect of the above described mechanism is that lateral displacement of the plate 210A in a direction away from the axis of the fish accommodating space 20 results in longitudinal displacement of the second longitudinal transmission member 239A away from the first end portion 20A of the fish accommodating space 20. This displacement of the second longitudinal transmission member 239A is used to force the head location plate mechanism 600 (or more specifically a mounting plate 650 upon which the mechanism 600 is mounted) correspondingly further away from the first end portion 20A of the fish accommodating space 20 for correspondingly larger fish. The two plates 210A, 210B thus serve as elements of the fish positioning and retaining means (in so far as they help to position the fish and retain it in position) and also elements of the fish size measuring means since the distance between the two plates will correspond to the width of a fish placed between them and this distance will be used to effect positioning of the fish relative to other elements of the apparatus.

Figure 6A:
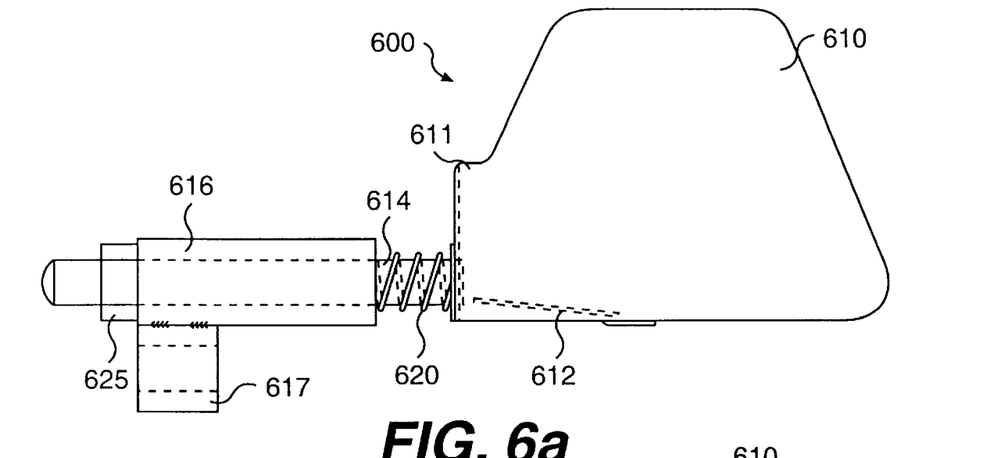
Figure 6B:
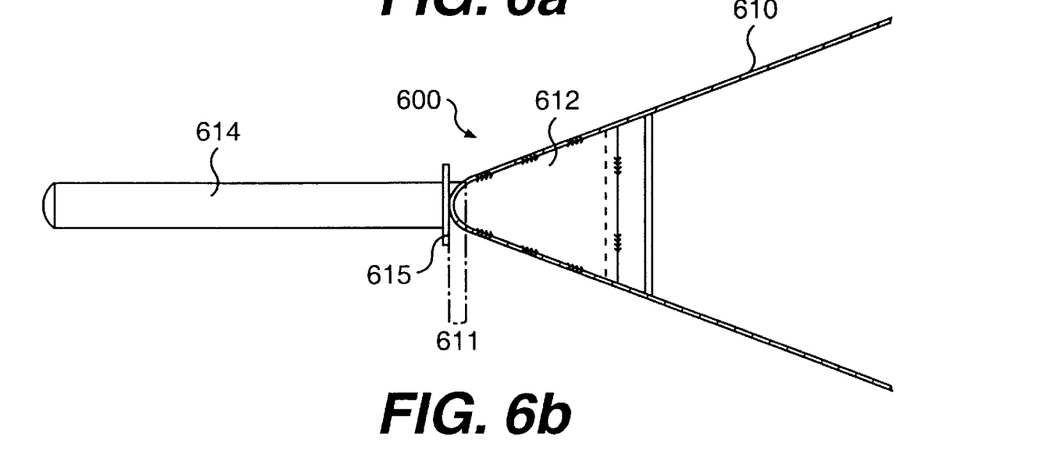
Figure 6C:
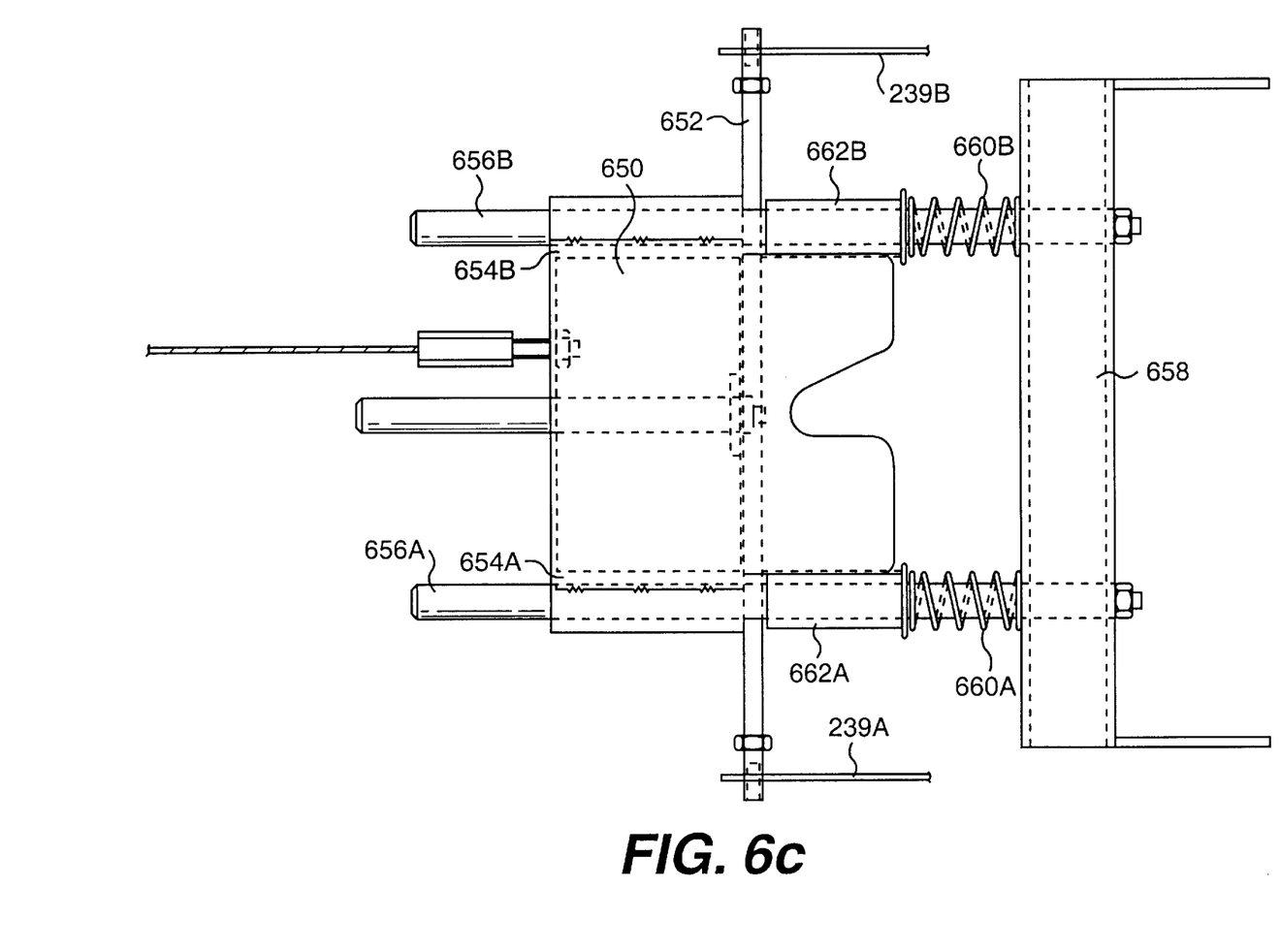
FIG. 6c is a plan view of a mounting plate upon which the fish head location plate mechanism of FIG. 6a is mounted.

FIG. 6*a* shows the fish head location plate mechanism 600 which constitutes a further part of the fish positioning and retaining means. FIG. 6*b* shows a plan view of part of the fish head location plate mechanism 600. The fish head location plate mechanism 600 comprises a fish head location plate 610 which is substantially V-shaped in horizontal cross-section having a vertex 611 where the two arms of the V-shape meet. The fish head location plate 610 is provided with an additional guide member 612 which helps to position the head of a fish in the vertical direction.

Attached to the fish head location plate 610 at the outside of the vertex 611 is a shaft 614 which extends substantially parallel to the axis of the fish head location plate 610. The shaft 614 extends through, and is slidingly engaged in, a cylindrical collar 616 which includes a mounting member 617 for mounting relative to the mounting plate 650. The fish head location plate 610 is biased away from the cylindrical collar 616 by a coil spring 620 which is fitted around the shaft 614 between the collar 616 and the fish head location plate 610. One end of the spring 620 engages an annular end 616A of the collar 616, and a washed 615 may be provided, attached to the shaft 614 or the fish head location plate 610, to facilitate engagement with the other end of the spring 620. In order to retain the shaft 614 in the cylindrical collar 616 a retention nut 625 is attached to the shaft 614 at a portion which extends from the end of the collar 616 which is distal from the fish head location plate 610.

The fish head location plate mechanism 600 may move axially relative to the fish accommodating space 20 since it is mounted on the movable mounting plate 650. The fish head location plate 610 thus serves to selectively locate and retain the head of the fish, and thereby correctly position the fish ready for slaughter.

FIG. 6*c* is a plan view of the mounting plate 650 which also shows the relative mechanical elements which enable it to move relative to the fish accommodating space 20.

The plate 650 is attached to a transversely extending rod 652 by which the plate 650 is coupled to the second longitudinal transmission member 239A and a corresponding transmission member 239B on the other side of the apparatus. The plate 650 is provided on the underside thereof with first and second longitudinally extending acetal bushes 654A, 654B at the edges thereof. The bushes 654A, 654B allow the mounting plate 650 to slidingly couple to first and second longitudinally extending guide rods 656A, 656B which are rigidly coupled to the base 40 via a transverse structural member 658. First and second springs 660A, 660B are provided in order to prevent the plate 650 from impacting the transverse structural member 658 and spacers 662A, 662B are also provided.

Bias means (not shown) is provided to bias the plate 650 towards the centre of the fish accommodating space 20, and because of the mechanical linkage between the mounting plate 650 and the laterally movable plates 210A, 210B the bias means also serves to bias the laterally movable plates 210A, 210B towards the axis of the fish accommodating space 20. The first and second laterally movable plates 210A, 210B are coupled via the rod 652 so that the move as a pair.

It will therefore be apparent that the mounting plate 650 is caused to move longitudinally by the forcing apart of the laterally movable plates 210A, 210B and that in use the axial position of the fish head location plate 610 is therefore determined by the width of the fish.

The axial position of the fish head location plate 610 determines the axial position of a fish in the second end portion 20B of the fish accommodating space 20 by receiving and locating the head of the fish.

As shown best in FIGS. 6a and 6b, once the head of the fish contacts the fish head location plate 610, it will force the fish head location plate against the bias force provided by the spring 620, thereby axially displacing the shaft 614 relative to the collar 616. This mechanism 600 can therefore be linked to a switch (not shown) or other device in order to act as a sensor for sensing when a fish is correctly positioned in the second end portion 20B of the fish accommodating space 20.

Figure 7A:
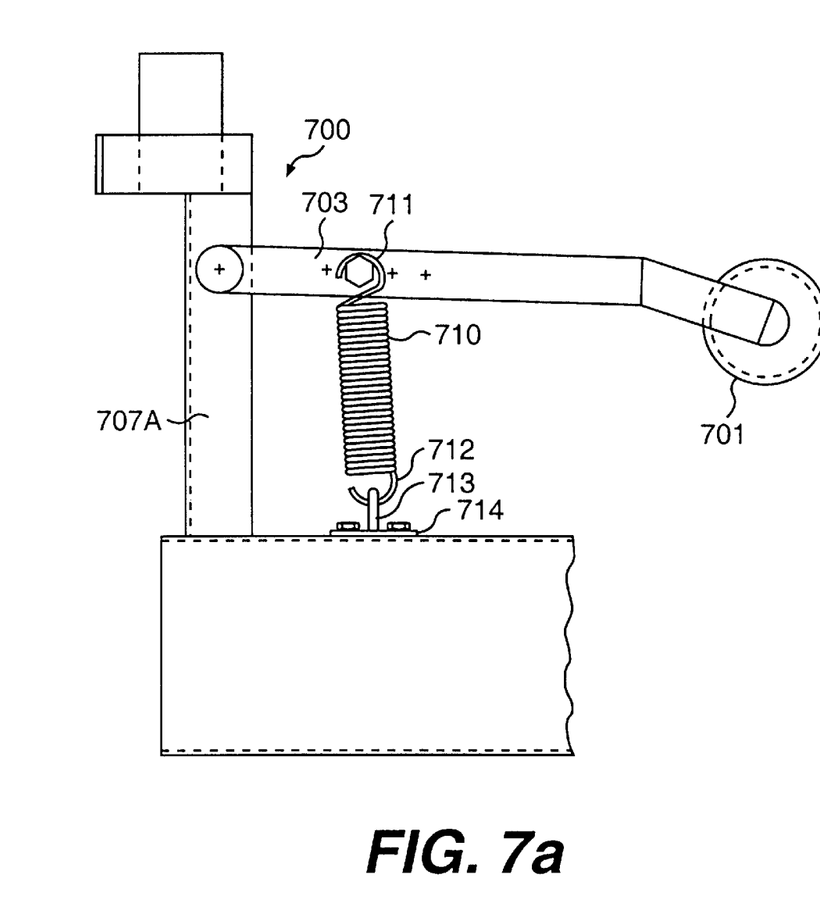
Figure 7B:
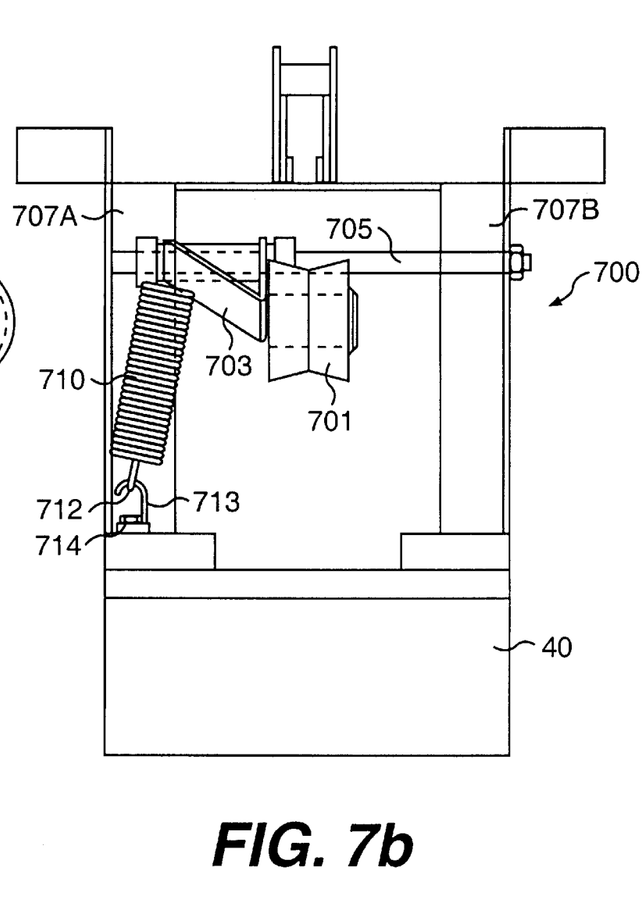

FIGS. 7a and 7b show respectively side and end elevations of a further element of the positioning and retaining means in the form of a pressure wheel mechanism 700 adapted to apply a downwards force to the top of a fish in the second end portion 20B of the fish accommodating space 20.

The mechanism 700 includes a pressure wheel 701, adapted to engage the upper part of a fish, which is rotatably supported by a wheel support arm 703. The wheel support arm 703 is pivotable about a horizontal axle 705 which is supported by first and second uprights 707A, 707B. The uprights are mounted upon the base 40.

In order to bias the pressure wheel 701 in a downwards directly there is provided bias means in the form of a coil spring 710 having a first, upper, end 711 coupled to the wheel support arm 703 and a second, lower, end 712 coupled to the base 40 via a spring anchor hook 713 which is attached to a plate 714 bolted to said base 40. Support arm retention means 730 (see FIG. 4a, but not shown in FIGS. 7a or 7b) is also provided for preventing the wheel support arm 703 and wheel 701 from dropping below a predetermined height.

When a fish is inserted into the second end 20B of the fish accommodating space 20 an upper surface of the fish will engage a lower surface of the pressure wheel 701, and will force the pressure wheel 701 and the wheel support arm 703 upwards against the bias force provided by the coil spring 710.

Figure 8A:
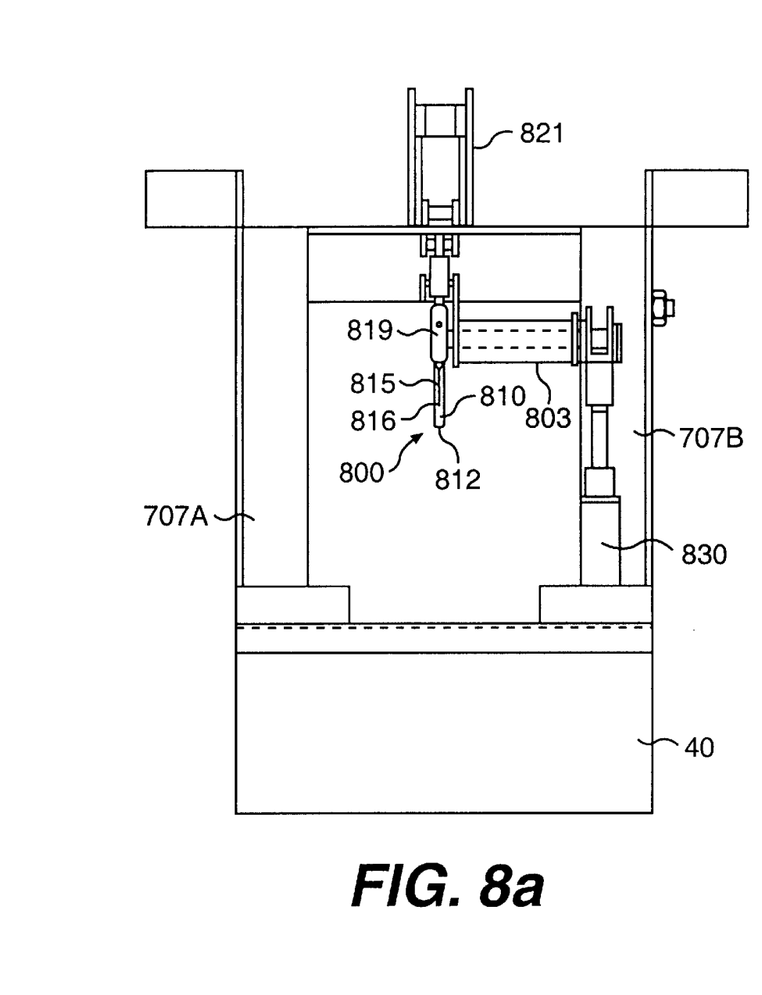
Figure 8B:
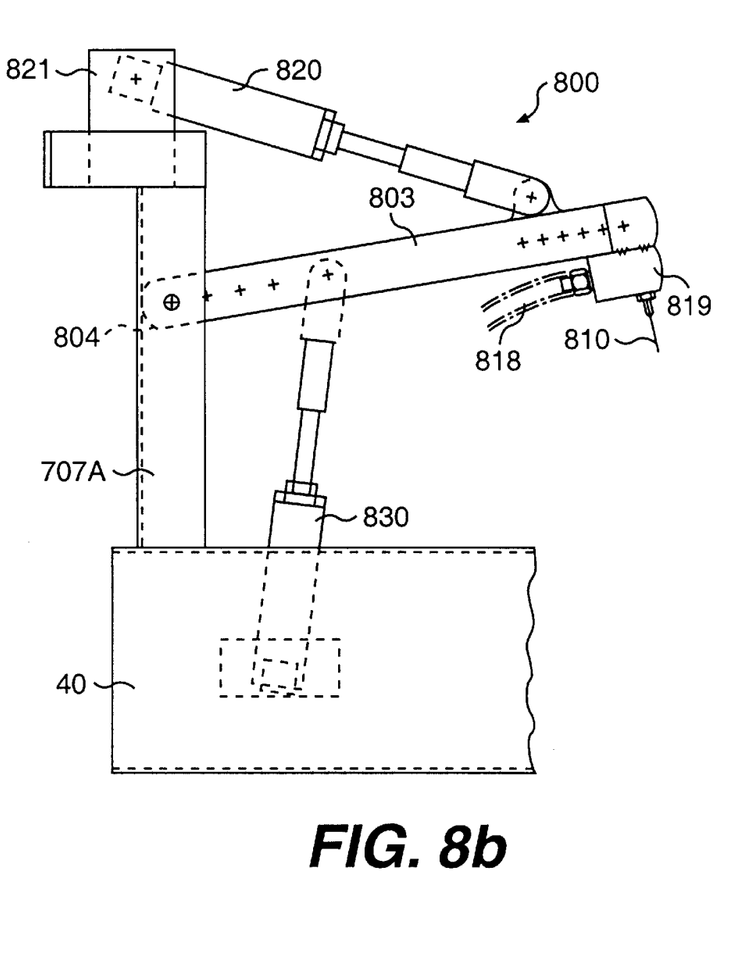

FIGS. 8a and 8b show respectively end and side views of a spike mechanism 800. A spike 810 is adapted to be forced into the brain of a fish in order to instantaneously slaughter said fish. The spike 810 is mounted, via a mounting block 819, adjacent a first end of a spike bearing arm 803. The spike bearing arm is pivotably coupled adjacent said first end thereof to a first end of a first pneumatic ram 820. The second end of the first pneumatic ram is pivotably coupled to a mounting member 821 which is rigidly coupled, via the uprights 707A, 707B and a horizontal member 822 extending between said two uprights, to the base 40.

The spike bearing arm is also pivotably coupled towards the centre thereof to a second pneumatic ram 830. The second end of the second pneumatic ram 830 is coupled to the base 40.

The second end of the spike bearing arm is fixed by being pivotably coupled to a horizontal rod 804 (not shown in FIG. 8a) which extends between the first and second uprights 707A, 707B.

The spike may be, for example, substantially circular in cross section, and a plurality of spikes may be provided, but in the illustrated embodiment theit is flattened towards its tip to provide a blade portion 812. In this embodiment the spike is provided with an internal bore 815 (shown in FIG. 8a) terminating in an aperture 816 towards the blade portion 812.

The internal bore 815 and aperture 816 are provided in order that a fluid, such as air, can be injected into the brain of the fish, after penetration by the spike, in order to ensure rapid and stress-free slaughter. In this embodiment air is fed to the spike via an air hose 818 which is connected to the mounting block 819. The mounting block includes internal channels (not shown) to provide an air passage from the air hose 818 to the spike 810. Air from the pneumatic system of the apparatus may be utilized for injection into the fish.

Figure 9A:
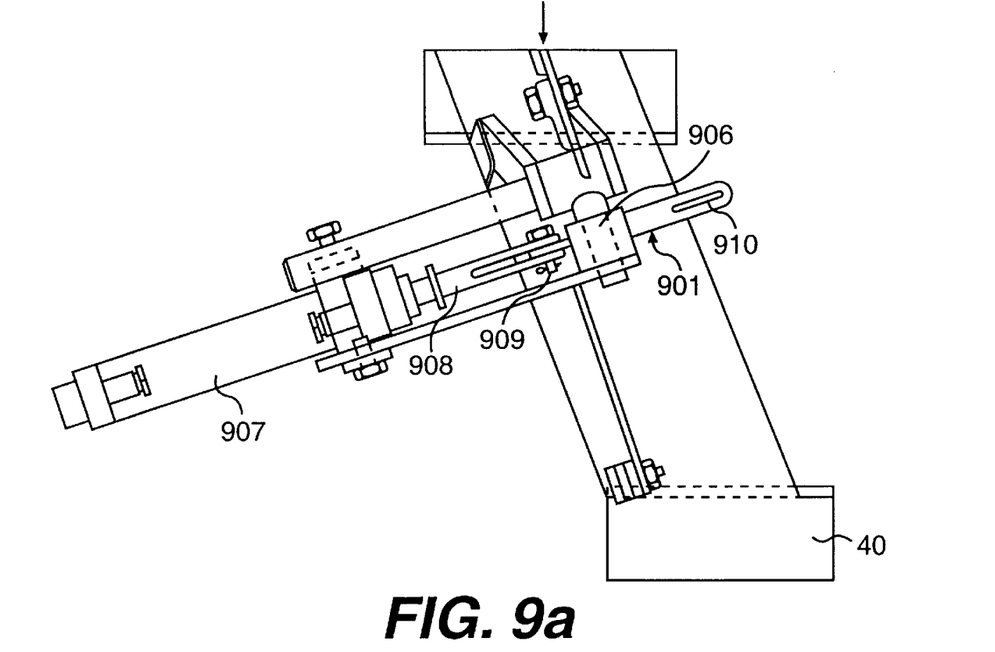
Figure 9B:
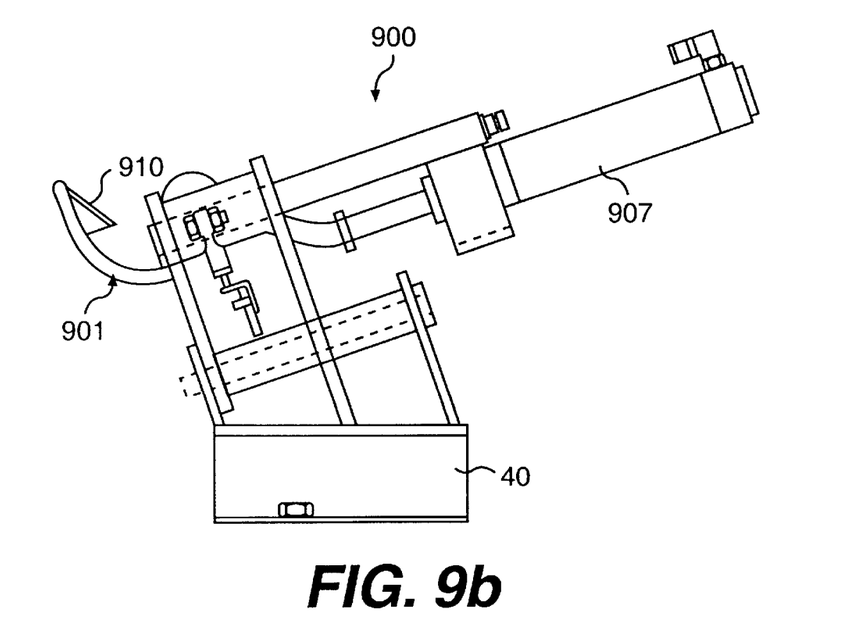
Figure 9C:
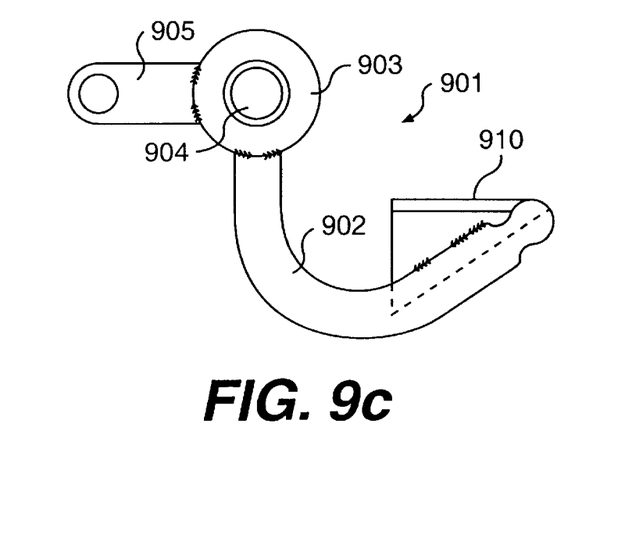
FIG. 9c is a side view of a knife-bearing member for use in the mechanism of FIGS. 9a and 9b.

FIGS. 9a and 9b show respectively plan and side views of a knife-bearing mechanism 900 including a knife-bearing member 901 which supports a knife blade 910. A side elevation of the knife-bearing member 901 and knife blade 910 is shown in FIG. 9c.

The knife-bearing member 901 includes a curved knife-bearing arm 902, a cylindrical portion 903 having an axially extending aperture 904 therein and a driving portion 905 having a linkage aperture 906 therein.

The mechanism 900 is mounted upon the bas 40 so that it may move the knife-bearing member laterally relative to the fish accommodating space 201. The degree of lateral movement is determined by a mechanical linkage (not shown) to the laterally movable plates 210A, 210B and is therefore determined by the size of a fish placed between said plates 210A, 210B so that the larger the fish the greater the lateral spacing between the axial centre of the second end portion 20B of the fish accommodating space 20, and the knife blade 910. This is desirable as a consequence of the fact that the larger a fish in the fish accommodating space 20, the greater will be the distance between the centre of the fish accommodating space and the gill opening of the fish.

The knife-bearing member 901 is pivotable about a support shaft 906 and is operated, that is, driven to pivot, by a pneumatic ram 907. The pneumatic ram 907 drives a forked driving member 908 which is pivotably connected to the driving portion 905 of the knife-bearing member 901 by a pin 909.

Figure 10:
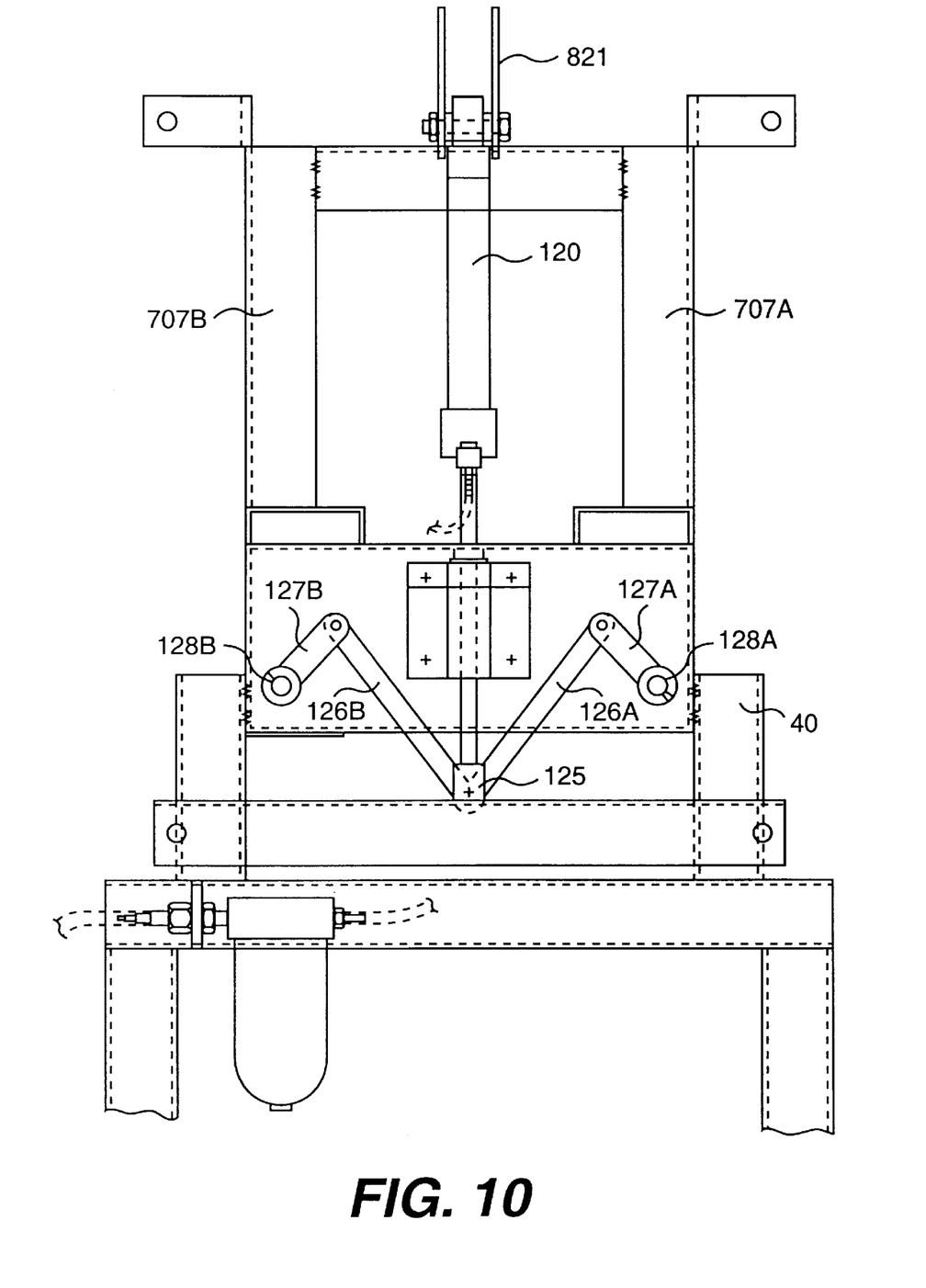
FIG. 10 is an end elevation of the embodiment of FIG. 4a showing a door operating mechanism.

FIG. 10 shows means in the form of a door operating mechanism 100 for automatically driving the doors 110A, 110B to open and close. A pneumatic ram 120 is connected at a first end thereof to the mounting member 821 and at a second end thereof to a linkage unit 125.

The linking unit 125 is pivotally connected to first and second side upwardly extending longer door driving members 126A, 126B which are pivotably connected to first and second side downwardly extending door driving members 127A, 127B. The downwardly extending door driving members are rigidly connected to rotatable door driving rods 128A, 128B which are mounted to the base 40. Extension of the pneumatic ram 120 thus causes the rotatable door driving rods 128A, 128B to rotate. The door driving rods 128A, 128B are connected by suitable linkages to the respective doors 110A, 110B so that operation of the ram drives the doors 110A, 110B to open or close.

In use the apparatus is initially in a configuration in which the doors 110A, 110B are closed, the laterally movable plates 210A, 210B are towards the centre of the second end portion of the fish accommodating space 20 and the mounting plate 650 is relatively close to the longitudinal centre of the second end portion 20B of the fish accommodating space 20. The blade-bearing member 901 and blade 910 are positioned relatively close to the axis of the second portion 20B of the fish accommodating space 20.

The fish is inserted into the first end portion 20A of the fish accommodating space 20 by manually lowering the fish via the open top of the fish harvester. The fish then rests upon the closed doors 110A, 110B. The fish is then moved manually towards and into the second end portion 20B of the fish accommodating space 20. The front of the fish engages the bevelled edges 214A, 214B of the outer removable plates 210A, 210B thus forcing the plates both laterally outwards and to the left as shown in FIG. 4b. As the plates 210A, 210B are forced outwards, the mounting plate 650 is forced away from the centre of the second end portion 20B of the fish accommodating space 20. The knife-bearing member 901 and blade 910 are also forced progressively further from the axial centre of the second end portion 20B of the fish accommodating space 20.

The extent to which the laterally movable plates 210A, 210B are displaced depends upon the width of a fish inserted between them. In use, the fish is moved longitudinally until the head of the fish engages the fish head location plate. The mechanical linkages between the laterally movable plates 210A, 210B and the fish head location plate mechanism mounting plate 650 and the knife-bearing member 901 will have been set up and calibrated for a given species so that for a given size (width) of fish the fish head location plate is deployed so that the fish is positioned correctly relative to the spike member 803 to ensure that operation of the spike member results in substantially instantaneous slaughter of the fish and so that the lateral position of the blade 910 relative to the fish accommodating space 20 is correct to ensure effective insertion between the gill and head or body of the fish and severing of the artery.

Upon engagement of the fish head and the fish head location plate 610 the sensor will be operated, initiating operation of the spike-bearing member 803 and resulting in instantaneous slaughter of the fish. Very shortly after the slaughter of the fish the blade-bearing member 901 is operated, resulting in successful bleeding of the fish. Shortly thereafter the doors 110A, 110B are operated, allowing the fish to drop from the fish accommodating space 20 to a holding tank situated beneath the fish harvester.

The described embodiment therefore provides automated apparatus for humane and stress-free slaughter and bleeding of a fish in a rapid and efficient manner.

It will be appreciated that the positioning of the spike member and the blade member relative to the fish are critical in order to allow effective operation of the fish harvester. The positioning of these elements relative to the fish is based on the realisation that fish of a given species conform to a shape which is characteristic of that species. The size of fish of a given species may vary considerably but the characteristic shape of the given species does not significantly vary with size. Means for automatically gauging the size of the fish and positioning the operational elements of the machine relative to the fish with reference to the gauged size of the fish can therefore be provided.

The embodiment described with reference to FIGS. 4a to 10 is but a single example of a fish harvester in accordance with the present invention.

In the described embodiment the size of the fish is gauged by movable members which physically engage the fish, and the displacement of the movable members is mechanically linked to other elements of the apparatus so as to provide correct positioning of the fish relative to the various operational elements. This provides a degree of simplicity in the construction of the apparatus. Alternative ways of gauging the size of the fish and positioning the operational members of the apparatus relative to the fish may of course be used. One example of an alternative would be to provide a microprocessor device which could receive data from the fish size measurement means, calculate the correct positions of the various operational elements relative to the fish and provide output to, for example, electric motors which could position the operational elements correctly. In such an embodiment the fish size could be gauged in any of a large number of ways, for example optical measurement.

The described embodiment was designed for use with farmed salmon and is able to automatically size and slaughter salmon ranging from about 1.5 to over 11 kg in weight. An embodiment of the invention for use with trout is particularly advantageous. Clearly the apparatus could be varied to operate upon different ranges of sizes or other species of fish.

A large number of variations in the various operational elements could of course be included without deviating from the scope of the invention. For example, in the described embodiment the fish is longitudinally positioned relative to the spike (and other operational elements) in accordance with the size of the fish by providing a longitudinally movable fish head location plate. In a variation the fish head location plate could be fixed and the spike-bearing member and other operational elements could be adapted to move longitudinally in order to be correctly positioned in relation to the fish. Also in the described embodiment the operational elements are driven by a pneumatic system but clearly other driving mechanisms such as hydraulics or electrical motors could be provided.

In the described embodiment the spike includes means to inject air into the brain of the fish after insertion of the spike. Whilst this is a preferred method of ensuring instantaneous slaughter of the fish, variations could be used. For example, a solid spike may kill the fish acceptably quickly. Alternatively, water or some other fluid might be injected into the fish brain to ensure greater physical damage to the brain and thus quicker slaughtering of the fish. A further variation would be to provide spike means including a main spike and a subsidiary member which could move relative to the main spike in order to increase damage to the brain after insertion of the spike into the brain.

Alternatively, other slaughtering means such as a substantial impact from a blunt instrument could be used in order to kill the fish or render it unconscious prior to bleeding. The described embodiment is intended to provide apparatus for the humane slaughter of fish and the spike means is provided in order to ensure instantaneous death of the fish. However, an embodiment in which no spike was provided but the severing of the artery was relied upon to cause the death of the fish whilst not preferred, should not be considered to fall outside the scope of the invention.

Similarly, the severing of an artery might not be deemed necessary in cases where it is not necessary to bleed fish.

In the described embodiment the fish is bled by severing an artery in the gill. It is desirable to sever an artery without externally marking the fish so accurate placing of the knife is important. Bleeding could alternatively be achieved by using a suitably positioned blade to sever other blood vessels of the fish. In particular, a blade could be inserted into the mouth of the fish or into the throat of the fish to sever the adjacent arteries.

Modifications and improvements may be incorporated without departing from the scope of the invention. In particular, although preferred embodiments are hereinbefore described by way of example, the foregoing description is intended to provide disclosure of mechanical and functional equivalents and variations which could clearly be seen to be potentially appropriate by a person skilled in the art.

I claim:

1. A fish harvester comprising:

a fish accommodating space having entrance means to allow insertion of a fish into said fish accommodating space for processing said fish therein and exit means to allow removal of a fish subsequent to such processing;

positioning and retaining means for positioning said fish in said fish accommodating space at least during said processing;

slaughtering means for processing said fish including first and second means arranged separately from each other for separate contact with a fish and including said first means for damaging the brain of said fish and said second means for severing one or more blood vessels of said fish, respectively; and driving means for driving said slaughtering means.

2. A fish harvester as claimed in claim 1 wherein said means for severing one or more blood vessels of said fish includes a blade.

3. A fish harvester as claimed in claim 1 wherein said means for damaging the brain of said fish includes spike means adapted to impact said fish and penetrate said impacted area.

4. A fish harvester as claimed in claim 3 wherein said spike means includes a rigid main spike portion and a movable subsidiary spike portion adapted to be movable relative to said rigid main spike portion after insertion into said fish.

5. A fish harvester as claimed in claim 1 wherein said slaughtering means includes means for injecting a fluid into said fish.

6. A fish harvester as claimed in claim 1 wherein said slaughtering means includes means for applying a vacuum to at least part of said fish.

7. A fish harvester as claimed in claim 1 wherein said means for severing one or more blood vessels of said fish is adapted to pass between a gill cover and one of the body and head of said fish.

8. A fish harvester as claimed in claim 7 wherein said severing means passes into the mouth of said fish.

9. A fish harvester as claimed in claim 7 wherein said severing means passes into the throat of said fish.

10. A fish harvester as claimed in claim 7 wherein said severing means is for severing a major artery of said fish.

11. A fish harvester as claimed in claim 7 wherein there is provided adjustable positioning means for adjustably positioning said severing means relative to the fish.

12. A fish harvester as claimed in claim 1 wherein said positioning and retaining means comprises at least one movable fish engaging member adapted to engage said fish.

13. A fish harvester as claimed in claim 12, further including first and second movable fish engaging members adapted to engage respective first and second sides of said fish.

14. A fish harvester as claimed in claim 1 further including sensor means for detecting the presence of a fish within said fish accommodating space.

15. A fish harvester as claimed in claim 1 further including gauging means for gauging the size of said fish.

16. A fish harvester as claimed in claim 15 wherein said gauging means includes means to gauge the size of the fish by reference to characteristics of the fish positioning and retaining means.

17. A fish harvester as claimed in claim 1 further including adjustable positioning means for selectively positioning a fish relative to the slaughter means.

18. A fish harvester as claimed in claim 1 wherein there is provided adjustable positioning means for positioning said slaughtering means relative to said fish accommodating space.

19. A fish harvester as claimed in claim 1 wherein said exit means comprises one or more members provided at the bottom of said fish accommodating space adapted to be displaced in order to allow a fish to fall from said fish accommodating space.

20. A fish harvester as claimed in claim 1 wherein said entrance means comprises at least one of a motor, and a fluid operated system.

21. A fish harvester as claimed in claim 1, wherein said means for severing one or more blood vessels of said fish is adapted to pass into the mouth of said fish.

\* \* \* \* \*

UNITED STATES PATENT AND TRADEMARK OFFICE
CERTIFICATE OF CORRECTION

PATENT NO. : 6,001,011
DATED : December 14, 1999
INVENTOR(S) : James George JOHNSON It is certified that error appears in the above-indentified patent and that said Letters Patent is hereby corrected as shown below:

On the title page, correct item [86] as follows:

PCT No.: PCT/GB96/01583.

Signed and Sealed this

Twenty-fourth Day of April, 2001

*Attest:*

NICHOLAS P. GODICI

*Attesting Officer*     *Acting Director of the United States Patent and Trademark Office*